(12) United States Patent　　(10) Patent No.: US 9,830,670 B2
Fadell　　(45) Date of Patent: Nov. 28, 2017

(54) INTELLIGENT POWER MONITORING

(75) Inventor: Anthony Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 864 days.

(21) Appl. No.: 12/463,133

(22) Filed: May 8, 2009

(65) Prior Publication Data

US 2010/0010857 A1　Jan. 14, 2010

Related U.S. Application Data

(60) Provisional application No. 61/079,751, filed on Jul. 10, 2008.

(51) Int. Cl.
*G06Q 50/06*　(2012.01)
*G06F 1/32*　(2006.01)
(Continued)

(52) U.S. Cl.
CPC .......... *G06Q 50/06* (2013.01); *G06F 1/3203* (2013.01); *G06F 1/329* (2013.01); *G06F 9/4893* (2013.01);
(Continued)

(58) Field of Classification Search
USPC ........................................................ 709/224
See application file for complete search history.

(56) References Cited

U.S. PATENT DOCUMENTS

| | | |
|---|---|---|
| 5,430,880 A | 7/1995 | Wajda |
| 5,915,120 A | 6/1999 | Wada et al. |
| 6,363,266 B1 | 3/2002 | Nonogaki |
| 6,443,418 B1 | 9/2002 | Itamochi et al. |
| 6,548,996 B2 * | 4/2003 | Yi .................................. 323/349 |
| 6,553,418 B1 * | 4/2003 | Collins et al. ................ 709/224 |
| 7,003,279 B2 * | 2/2006 | Nickum ....................... 455/405 |

(Continued)

FOREIGN PATENT DOCUMENTS

| | | |
|---|---|---|
| CN | 1371541 A | 9/2002 |
| EP | 0961204 A2 | 12/1999 |

(Continued)

OTHER PUBLICATIONS

B. Ostadi et al., "A non-linear programming model for optimization of the electrical energy consumption in typical factory" Applied Mathematics and Computation, 187 (2007) 944-950.

(Continued)

*Primary Examiner* — Shay S Glass
*Assistant Examiner* — Russell S. Glass
(74) *Attorney, Agent, or Firm* — Kilpatrick Townsend & Stockton LLP

(57) ABSTRACT

An electronic device operative to monitor and control processes and operations based on the power cost of those processes and operations are provided. The electronic device can identify processes or networked devices requiring power, determine the expected amount of power required for the process or networked device, and calculate the cost of the power requirement. For example, the electronic device can receive data or algorithms defining the manner in which a power supplier computes the cost of consumed power, and predict the expected cost of the particular power requirement. Based on the importance of the process or device, and the expected power cost, the electronic device can perform a process or provide power to a networked device, or alternatively delay or cancel a process to ensure that the power cost of the device remains within preset boundaries (e.g., the power cost of the device or of a home network of devices does not exceed a maximum cap).

18 Claims, 9 Drawing Sheets

(51) Int. Cl.
 *G06Q 10/06* (2012.01)
 *G06F 9/48* (2006.01)
(52) U.S. Cl.
 CPC ........ *G06Q 10/0639* (2013.01); *Y02B 60/144* (2013.01)

(56) References Cited

U.S. PATENT DOCUMENTS

| | | |
|---|---|---|
| 7,386,744 B2 | 6/2008 | Barr et al. |
| 7,426,196 B2 | 9/2008 | Gopalakrishnan et al. |
| 7,489,106 B1 | 2/2009 | Tikhonov |
| 2002/0178387 A1 | 11/2002 | Theron |
| 2003/0233201 A1 | 12/2003 | Horst et al. |
| 2004/0113890 A1 | 6/2004 | Ranta |
| 2005/0108075 A1 | 5/2005 | Douglis et al. |
| 2006/0026521 A1 | 2/2006 | Hotelling et al. |
| 2006/0026535 A1 | 2/2006 | Hotelling et al. |
| 2006/0253225 A1 | 11/2006 | Ueno et al. |
| 2007/0136217 A1 | 6/2007 | Johnson et al. |
| 2007/0271006 A1 | 11/2007 | Golden et al. |
| 2009/0063877 A1 | 3/2009 | Lewis et al. |

FOREIGN PATENT DOCUMENTS

| | | |
|---|---|---|
| EP | 1777607 A1 | 4/2007 |
| JP | H09305272 | 11/1997 |
| JP | 2000253587 | 9/2000 |
| JP | 2002297715 | 10/2002 |
| JP | 2003111311 | 4/2003 |
| JP | 2004193890 A | 7/2004 |
| JP | 2004-297954 | 10/2004 |
| JP | 2005-285112 | 10/2005 |
| JP | 2006172257 A | 6/2006 |
| JP | 2006230146 | 8/2006 |
| JP | 2008-067473 | 3/2008 |
| KR | 10-2006-0087435 | 8/2006 |
| KR | 10-2006-0131738 | 12/2006 |
| WO | 2003065214 A1 | 8/2003 |
| WO | WO2005/029243 | 3/2005 |

OTHER PUBLICATIONS

EMC White Paper, "Achieving Energy Efficiency with EMC CLARiiON CX3 Storage Systems, Best Practices Planning" EMC Corporation, Oct. 2007, pp. 1-22.

Japanese Office Action App No. 2011-517594, dated Aug. 29, 2012.
Korean Office Action App. No. 10-2011-7002666, dated Aug. 31, 2012.
Chinese Office Action dated Dec. 26, 2012, for Application No. 200980133336.2.
TE Chnol et al. :"Green HPC Dynamic Power Management in HPC", A Technology Whitepaper, Nov. 12, 2008; XPO55209957 Retrieved from the internet: URL: http://www.hpcadvisorycouncil.com/pdf/vendor_content/Platform%20HPCgreenWP.pdf.
European Patent Application No. 09790184.7—Examination report dated Sep. 2, 2015.
Japanese Patent Application No. 2014-143481—Office Action dated Jul. 15, 2015.
Japanese Patent Application No. 2014-143481—Office Action dated Feb. 24, 2016.
Chinese Application No. 200980133336.2—Office Action dated Jul. 11, 2013.
Japanese Application No. 2011-517594—Office Action dated May 22, 2013.
Korean Application No. 10-2011-7002666—Final Rejection dated May 20, 2013.
Final Rejection; KR Patent Application No. 10-2011-7002666 dated Mar. 29, 2013.
"Notification of Re-examination", Chinese Patent Application No. 200980133336.2, dated Apr. 2, 2015, 14 pages.
"Re-examination Decision", Chinese Patent Application No. 200980133336.2, dated Aug. 26, 2015, 30 pages.
"Rejection Decision", Chinese Patent Application No. 200980133336.2, dated Jan. 13, 2014, 11 pages.
"Office Action", European Patent Application No. 09790184.7, dated Dec. 15, 2011, 9 pages.
"Extended Search Report", European Patent Application No. 13195961.1, dated Mar. 7, 2017, 9 pages.
"Final Rejection", Japanese Patent Application No. 2011-517594, dated Mar. 12, 2014, 7 pages.
"Office Action", Korean Patent Application No. 10-2011-7025701, dated Aug. 12, 2013, 7 pages.
PCT/US2009/050024, "International Preliminary Report on Patentability", dated Feb. 3, 2011, 21 pages.
PCT/US2009/050024, "International Search Report", dated Jun. 7, 2010, 6 pages.
PCT/US2009/050024, "International Written Opinion", dated Jun. 7, 2010, 11 pages.
"Invitiation to Proceed", European Patent Application No. 13195961.1, dated Apr. 10, 2017, 2 pages.

\* cited by examiner

INTELLIGENT POWER MONITORING

CROSS REFERENCE TO RELATED APPLICATION

This application claims the benefit of commonly-assigned U.S. Provisional Patent Application No. 61/079,751, filed Jul. 10, 2008, which is hereby incorporated by reference herein in its entirety.

BACKGROUND OF THE INVENTION

This relates to monitoring power usage in a computer or other processor-based device.

Household power consumption continues to increase as the number of electronic devices proliferates. Portable media players, mobile telephones, and personal digital assistants, and other portable electronic devices have batteries that must be charged. Moreover, as users spend more time engaged in on-line activities, personal computers and other fixed electronic devices are being left on for longer periods, and even continually. Some personal computers sometimes are being left on simply to serve as power supplies for the charging of the aforementioned portable devices via connections, such as Universal Serial Bus ("USB") connections, that provide power in addition to data (rather than charging those devices from the household electric service using their dedicated chargers), even though the power supply of a personal computer is much larger than is needed for such a function, and as such draws much more power than such a function would otherwise demand. As the price of electricity increases, such uses of power can cost users more.

SUMMARY OF THE INVENTION

In accordance with one aspect of the present invention, systems and methods for controlling the performance of electronic device operations based on the power cost associated with the operations is provided.

One or more electronic devices can be operative to perform different processes or operations. Each process or operation can require the use of particular electronic device components, and different amounts of each component's resources (e.g., different durations of each component's activity). For example, a file transfer operation can require the use of a hard drive or solid state drive, input mechanism for providing the file transfer operation, and processor for transferring the file in memory or storage. The particular amount of resources required by each component can be the same or vary based on the type of operation (e.g., substantially similar input mechanism power requirements for file transfers, but different processor and storage requirements based on the size of the file transfer).

The electronic device can thus predict, based on the components used and the amount of resources each component requires, the amount of power required to perform a particular operation. To determine the power cost associated with each operation, however, the electronic device may require information regarding the manner in which the cost of power is computed. The cost of power can vary based on a number of factors, including for example the time of day, week or month, the consumer's tier or type of service, the amount of power previously consumed by the consumer, alternate sources of power used by the consumer (e.g., solar cells used during the day), or any other suitable criteria. The criteria can be combined into one or more tables or graphs, or into one or more equations or algorithms used by the power supplier to determine how much to charge for each consumer's power use.

To determine the power cost associated with different electronic device operations, the electronic device can receive from the power supplier information regarding the manner in which power costs are computed. Using the received information, the electronic device can provide information regarding expected power consumption (e.g., power consumption information related to the particular operation) and determine the expected cost of the operation. Alternatively, the electronic device can provide information regarding prospective power consumption (e.g., the amount of power required and when the power will be consumed) and receive from the power supplier an expected cost for the operation.

To control power costs of different electronic device operations, the electronic device can define conditions, boundaries or limits to the power cost of operating the device. For example, boundaries or limits can be set for the entire device (e.g., the device cannot exceed a particular power costs per week). As another example, boundaries or limits can be set for particular processes or types of processes executed by the electronic device (e.g., media playback processes cannot exceed a particular power cost per day). Before performing each operation, the electronic device can then determine the power cost associated with the operation, and determine whether the power cost satisfies the boundaries or limits set for the operation.

If the electronic device determines that the power cost of a particular process or operation does not satisfy the set conditions, the electronic device can first attempt to reschedule the operation or process for a later time when the power cost is lower. For example, the electronic device can determine whether the power cost of the process at an off-peak time satisfies the power cost conditions for the process. If the conditions can be satisfied at a later time, the electronic device can reschedule the process for the later time. If the conditions are not satisfied, even at a later time, the electronic device can prompt the user to overrule the conditions to allow the process or operation to proceed. For example, the electronic device can prompt the user for an administrative password providing sufficient rights to execute the operation. If the user provides appropriate credentials, the electronic device can perform the process despite the power cost.

In some embodiments, an electronic device can be coupled to several other electronic devices in a network. For example, the electronic device can be coupled to one or more host devices (e.g., a server), periphery devices (e.g., a printer or a portable media device), or any other suitable device. To reduce the cost of operating all of the networked devices, one or more particular electronic devices can manage the power costs associated with all of the devices in the network. In some embodiments, a single device can control the execution of processes or operations of each electronic device in the network. As another example, each electronic device in the network can control its own power costs. As still another example, some devices (e.g., host devices) can manage their power costs and the power costs associated with their respective peripheral devices (e.g., a cellular telephone connected to a host device to recharge a battery).

The electronic device can use an approach similar to that used for managing the power costs of processes to manage the power cost of electronic devices. For example, the electronic device can assign power cost conditions, boundaries or limits to specific electronic devices or types of electronic devices in the network. As another example, the electronic device can assign power cost conditions, boundaries or limits to specific operations of one or more electronic devices in the network (e.g., recharging operations by host devices). In response to determining whether particular operations to be executed by a networked device fail to satisfy the associated power cost conditions, the electronic device can reschedule the particular operations, or prompt the user to provide administrative rights to authorize the particular operations despite the power cost conditions.

Therefore, there is provided a power management method for a system that performs several processes. The method includes assigning a priority to each of the processes, accessing power rate information (e.g., time-of-day pricing information), and for each respective one of the processes, executing that respective one of the operations on a schedule based at least in part on the accessed power rate information and the priority assigned to that respective one of the processes.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
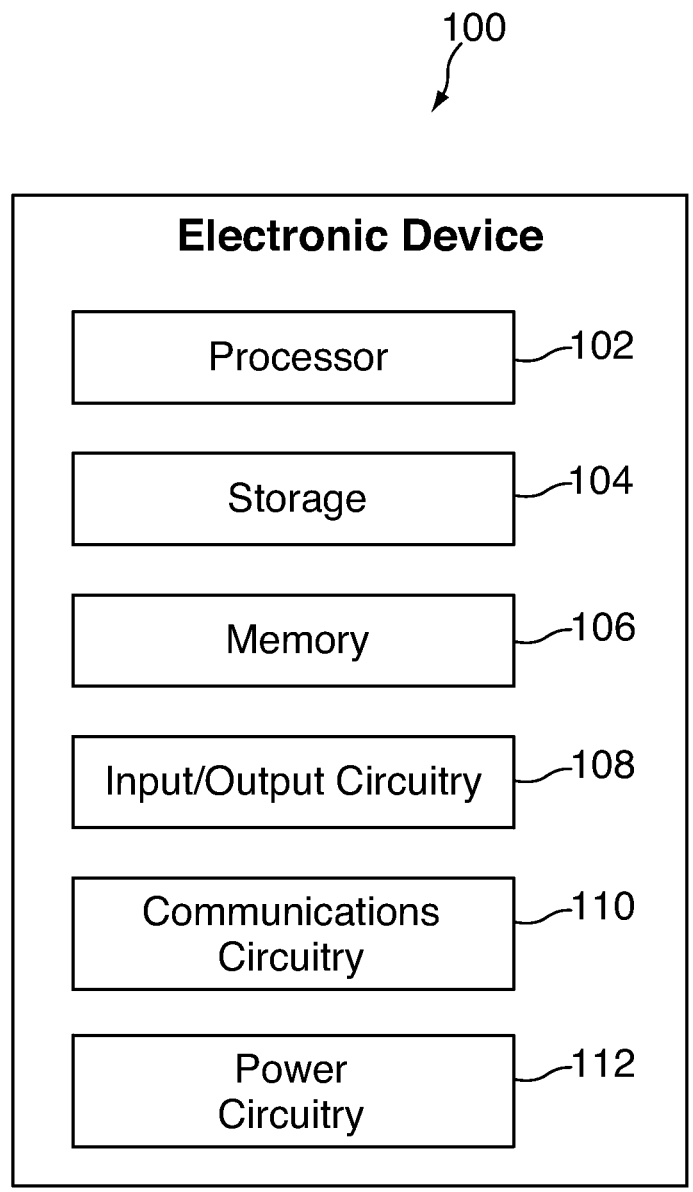
FIG. 1 is a schematic view of an illustrative electronic device in accordance with one embodiment of the invention.

FIG. 1 is a schematic view of an illustrative electronic device in accordance with one embodiment of the invention. Electronic device 100 can include control circuitry 102, storage 104, memory 106, input/output circuitry 108, communications circuitry 110, and power circuitry 112. In some embodiments, one or more of electronic device components 100 can be combined or omitted (e.g., combine storage 104 and memory 106). In some embodiments, electronic device 100 can include other components not combined or included in those shown in FIG. 1 (e.g., motion detection components, a display, bus, or input mechanism), or several instances of the components shown in FIG. 1. For the sake of simplicity, only one of each of the components is shown in FIG. 1.

Control circuitry 102 can include any processing circuitry or processor operative to control the operations and performance of electronic device 100. For example, control circuitry 100 can be used to run operating system applications, firmware applications, media playback applications, media editing applications, or any other application. In some embodiments, the control circuitry can drive a display and process inputs received from a user interface.

Storage 104 can include, for example, one or more storage mediums including a hard-drive, solid state drive, flash memory, permanent memory such as ROM, any other suitable type of storage component, or any combination thereof. Storage 104 can store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that can be stored in storage 104. In some embodiments, memory 106 and storage 104 can be combined as a single storage medium.

Input/output circuitry 108 can be operative to convert (and encode/decode, if necessary) analog signals and other signals into digital data. In some embodiments, input/output circuitry 108 can also convert digital data into any other type of signal, and vice-versa. For example, input/output circuitry 108 can receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, power circuitry 112, or any other component of electronic device 100. Although input/output circuitry 108 is illustrated in FIG. 1 as a single component of electronic device 100, several instances of input/output circuitry can be included in electronic device 100.

Electronic device 100 can include any suitable mechanism or component for allowing a user to provide inputs to input/output circuitry 108. For example, electronic device 100 can include any suitable input mechanism, such as for example, a button, keypad, dial, a click wheel, or a touch screen. In some embodiments, electronic device 100 can include a capacitive sensing mechanism, or a multi-touch capacitive sensing mechanism. Some sensing mechanisms are described in commonly owned Hotelling et al. U.S. Published Patent Application No. 1006/0026521, filed Jul. 30, 1004, entitled "Gestures for Touch Sensitive Input Device," and Hotelling et al. U.S. Published Patent Application No. 1006/0026535, filed Jan. 18, 2005, entitled "Mode-Based Graphical User Interfaces for Touch Sensitive Input Device," both of which are incorporated herein in their entirety.

In some embodiments, electronic device 100 can include specialized output circuitry associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

In some embodiments, I/O circuitry 108 can include display circuitry (e.g., a screen or projection system) for providing a display visible to the user. For example, the display circuitry can include a screen (e.g., an LCD screen) that is incorporated in electronics device 100. As another example, the display circuitry can include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display (e.g., display 130, FIG. 1).

Communications circuitry 110 can include any suitable communications circuitry operative to connect to a communications network (e.g., communications network 150, FIG. 1) and to transmit communications (e.g., voice or data) from communications device 100 to other devices within the communications network. Communications circuitry 110 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

In some embodiments, communications circuitry 110 can be operative to create a communications network using any suitable communications protocol. For example, communications circuitry 110 can create a short-range communications network using a short-range communications protocol to connect to other devices. For example, communications circuitry 110 can be operative to create a local communications network using the Bluetooth® protocol to couple electronic device 100 with a Bluetooth® headset.

Electronic device 100 can include one more instances of communications circuitry 110 for simultaneously performing several communications operations using different communications networks, although only one is shown in FIG. 1 to avoid overcomplicating the drawing. For example, electronic device 100 can include a first instance of communications circuitry 110 for communicating over a cellular network, and a second instance of communications circuitry 110 for communicating over Wi-Fi or using Bluetooth®. In some embodiments, the same instance of communications circuitry 110 can be operative to provide for communications over several communications networks.

In some embodiments, electronic device 100 can be coupled a host device for data transfers, synching the communications device, software or firmware updates, providing performance information to a remote source (e.g., providing riding characteristics to a remove server) or performing any other suitable operation that can require electronic device 100 to be coupled to a host device. Several electronic devices 100 can be coupled to a single host device using the host device as a server, and instead or in addition electronic device 100 can be coupled to several host devices (e.g., for each of the plurality of the host devices to serve as a backup for data stored in electronic device 100). In some embodiments, electronic device 100 can be coupled to a host device or a periphery device to transfer power, for example to be powered or be charged by the host device, or to power or charge the periphery device.

Power circuitry 112 can include any suitable circuitry for providing power to components of electronic device 100. For example, power circuitry 112 can include one or more of a battery (e.g., a gel, nickel metal hydride, nickel cadmium, nickel hydrogen, lead acid, or lithium-ion battery), an uninterruptible or continuous power supply (UPS or CPS), and circuitry for processing power received from a power generation source (e.g., power generated by an electrical power plant and delivered to the user via an electrical socket). The received power can be provided as alternating current or direct current, and processed to transform power or limit received power to particular characteristics. For example, received power can be transformed to or from direct current, and constrained to one or more values of average power, effective power, peak power, energy per pulse, voltage, current (e.g., measured in amperes), or any other characteristic of received power. Power circuitry 112 can be operative to request or provide particular amounts of power at different times, for example based on the needs or requirements of electronic device 100 or periphery devices coupled to electronic device 100 (e.g., request more power when charging a battery than when the battery is charged).

The electronic device can include different power management modes to control and manage power consumption by the device and other devices coupled to the electronic device. In particular, a portable electronic device (e.g., a laptop or notebook computer) can include power management modes for reducing power consumption when the device is not connected to a remote power supply (e.g., the electronic device is not plugged in to a wall socket). For example, the power management mode can prevent non-essential power intensive processes from being performed while on battery. As another example, the power management mode can prevent the electronic device from powering or charging a peripheral device in the absence of an external power source for the electronic device. In some embodiments, an electronic device can refrain from providing power to particular electronic device components after a period of non-use. For example, an electronic device can turn off a hard drive, dim or turn off a display, or place a processor in a low-power "sleep" or "hibernate" mode. Some or all of the power management settings can be set automatically or by a user (e.g., the user defines the duration or condition before a laptop computer switches to a sleep mode).

While such power monitoring modes are applied to devices based on an intermittent power supply (e.g., portable devices that are not permanently coupled to a remote power source, such as a wall socket), they may not apply during operation, as it defeats the purpose of having an electronic device in use by the user to spontaneously place the device in hibernation mode. Different electronic device operations or processes, however, can invoke the use of different electronic device components or different amounts of electronic device component resources. Because different processes can require different components in different quantities, the different processes can be associated with different power consumptions or different power requirements. For example, a copying process that involves reading and copying data from an electronic device hard drive to a peripheral device can require more power than displaying a text document. As another example, decoding media for audio and video playback can require more power than transferring data over a remote communications link (e.g., using an FTP protocol over an Internet connection).

In addition, not all electronic device operations or processes can have the same priority. For example, processes that run in the background (e.g., a virus scan) can be less important than processes associated with applications in use by the user. As another example, transferring data between the electronic device and a remote storage source (e.g., a scheduled backup) can have a lower priority than checking a remote server for incoming messages (e.g., new e-mail messages). In addition, some electronic device operations or processes instructed or scheduled by a user can be performed at any suitable time, including the scheduled time or time when the instruction was received, or a later time. For example, some instructed or scheduled processes can be time-sensitive, or alternatively executed any time within a set or known duration (e.g., within 18 hours, 1 day, or by a particular date and time).

In some cases, the cost of power received from a power source (e.g., a power generation plant) can vary over time. For example, power can be more expensive in the mornings and evenings (e.g., when more consumers require power), and less expensive at night (e.g., when more consumers are sleeping and not using electronic devices). As another example, if a consumer has a personal power generation source (e.g., solar panels), power consumption may be cheaper during the day (e.g., when sunlight can provide power to the consumer's solar panels), and more expensive at night (e.g., when the consumer relies on a public power supply). As still another example, a power supply company can dramatically increase the cost of power during a crisis or when available power sources are low (e.g., during a heat wave when air conditioning units are using a disproportionate amount of the available power generated by a power source).

A power supplier can assign costs to generated power using any suitable approach. In some embodiments, the power supplier can assign costs based on expected demands for power. For example, the power supplier can determine (e.g., based on past usage) the times of day, week, month or year at which power demand is the highest, and adjust the cost of power based on the determined expected usage. The power supplier can use any suitable criteria in determining how much to charge for power. For example, the power supplier can increase the cost of power during periods when power demands are the highest to increase or maximize profits. As another example, the power supplier can increase the cost of power when power demands are the highest or decrease the cost of power when power demands are the lowest to incite consumers to adjust their power consumption (e.g., to maintain a uniform demand for power over time and avoid failures due to excessive demand).

In some embodiments, the power supplier can instead or in addition modify the cost of power based on the consumer or characteristics of the consumer. For example, a consumer can pay a flat rate for a particular amount of power, and a variable rate for additional power in excess of a limit (e.g., a rate varying based on time of day). As another example, a consumer can pay a regular fee in exchange for one or more preferential rates for power (e.g., pay a fee to pay an off-peak rate during peak hours). As still another example, the cost of power can be higher for consumers of large amounts of power (e.g., those who consume a disproportionate amount of power are charged a fixed penalty or a higher per unit rate). As still yet another example, the cost of power can be lower for users who generate their own power or provide power back to the power grid (e.g., consumers having solar panels or other systems for generating power).

The power supplier can define the relationships between power and cost using any suitable approach. In some embodiments, the power supplier can define the cost of power based on a consumer or group or tier of consumers. As another example, the power supplier can define the cost of power based on the time of day, week, month or year. The power supplier can generate one or more tables or grids based on consumers or time to determine an expected cost of power. In some embodiments, the power supplier can instead or in addition define one or more algorithms or processes for determining the cost of power consumption based on one or more characteristics (e.g., duration, time, consumer's past consumption, and consumer's type of service).

To reduce the total cost of operating an electronic device, a user can vary the power consumption of the device to maximize consumption when power costs are low, and minimize consumption when power costs are high. For example, the electronic device can perform different processes or operations based on power cost considerations instead of or in addition to when a user instructs the device to perform a process (e.g., in response to a user instruction to perform a process or to schedule a process). To determine when to perform different processes, however, the electronic device can require information regarding the cost of power at different times. In particular, the electronic device can require data reflecting the cost of power at different instances, and data indicating unexpected or emergency changes to the power cost data.

The electronic device can determine the cost of power consumption due to one or more processes using any suitable approach. In particular, the electronic device can first determine the expected or projected power requirements of the one or more processes. For example, the electronic device can determine which electronic device components will be used to perform a process, and how long each component will be in use (e.g., how long will a hard drive need to turn or a hard drive head need to move, or how many operations will a processor be required to perform for a particular process). Once the electronic device has determined its power requirements, the electronic device can determine the expected power cost of the processes using any suitable approach. In some embodiments, the electronic device can access data provided by the power supplier to determine an expected cost of power consumption at a particular time. For example, the electronic device can access tables or grids published by a power supplier that describe how the cost of power is calculated. As another example, the electronic device can receive access to algorithms or equations providing power cost in response to characteristics of expected or projected power consumption (e.g., provide the moment and duration of projected power consumption, and past consumption to receive the cost for the projected consumption). As still another example, the electronic device can receive the actual power cost algorithms or equations from the power supplier. The electronic device can retrieve and store power cost information or algorithms at any suitable time, including when power consumption costs are made, at predetermined intervals, or at any other suitable time.

Using the received power cost calculation information, the electronic device can distribute the execution of the one or more processes to minimize the total power cost. For example, the electronic device can account for the relative importance of each process, deadlines for performing one or more of the processes (e.g., time-constrained processes), user instructions with respect to one or more processes (e.g., a user instruction to delay a process). In some embodiments, the electronic device can delay or cancel one or more processes having a lesser importance to limit or reduce the power cost of the electronic device. If the electronic device determines that one or more processes cannot be executed given the set power consumption constraints, the electronic device can prompt or receive an instruction from the user to overrule the power consumption constraints and execute some or all of the restricted processes.

In some embodiments, an electronic device can be connected to several other devices, including for example one or more host devices, one or more peripheral devices, or and or more standalone devices (e.g., networked computers in a home or office network). The devices can be connected using any suitable approach, including for example a network (e.g., using an Ethernet protocol), wired connectors (e.g., USB connections), or any other type of connection allowing electronic devices to share information or resources (e.g., data or power). Several approaches can be used to efficiently control the power consumption of some or all of the connected devices. In some embodiments, each electronic device can operate independently (e.g., independently receive power cost information and determine how to schedule different processes based on that information). As another example, one or more devices can receive the power cost information and transmit that information to other devices in the network (e.g., a router or host device receives the power cost information and provides it to the electronic devices in the network) to allow each device to manage its power consumption. This approach can be of particular interest or use if one or more of the electronic devices do not have access to the power supplier information (e.g., a peripheral device that does not include communications circuitry suitable for requesting or receiving power consumption information from a power supplier).

In some embodiments, every device in the network may not have the capabilities required to determine the cost of power consumption, or to distribute the execution of the processes over time (e.g., the device has insufficient processing power to determine the most efficient distribution of processes). In such cases, one or more electronic devices in the network can receive data reflecting the cost of power consumption and identify the processes to be performed by each electronic device, and assign a particular time at which each device is to perform its processes. In some embodiments, the one or more electronic devices can monitor the performance of other electronic devices to ensure that the processes to be executed by each device are executed at the proper time, and to start or stop a process being executed at an improper time (e.g., due to an incorrect instruction provided to an electronic device, or to a change in circumstances (e.g., the amount of power available to the electronic devices unexpectedly increased or decreased).

A user can control the manner in which power consumption of the electronic device is managed using any suitable approach. For example, the electronic device can provide one or more options for defining the total power cost allocated to the device over a particular duration (e.g., a day, week or month). Using the defined power cost allocation, the electronic device can automatically schedule and perform different processes at suitable times (e.g., based on the power cost information received from the power source) to ensure that processes are executed and that the power cost does not exceed the limit. The electronic device can prioritize the various processes in need of execution based on any suitable approach. For example, the electronic device can provide a higher priority to operating system processes essential to the proper operation of the device, a medium priority to applications running on the electronic device, and a lower priority to scheduled tasks regularly running on the device. In some embodiments, the electronic device can determine which processes or tasks a user of the device has provided instructions to perform, and prioritize those tasks (e.g., what the user is doing) over other application tasks (e.g., tasks of applications that the user is not currently using).

Figure 2:
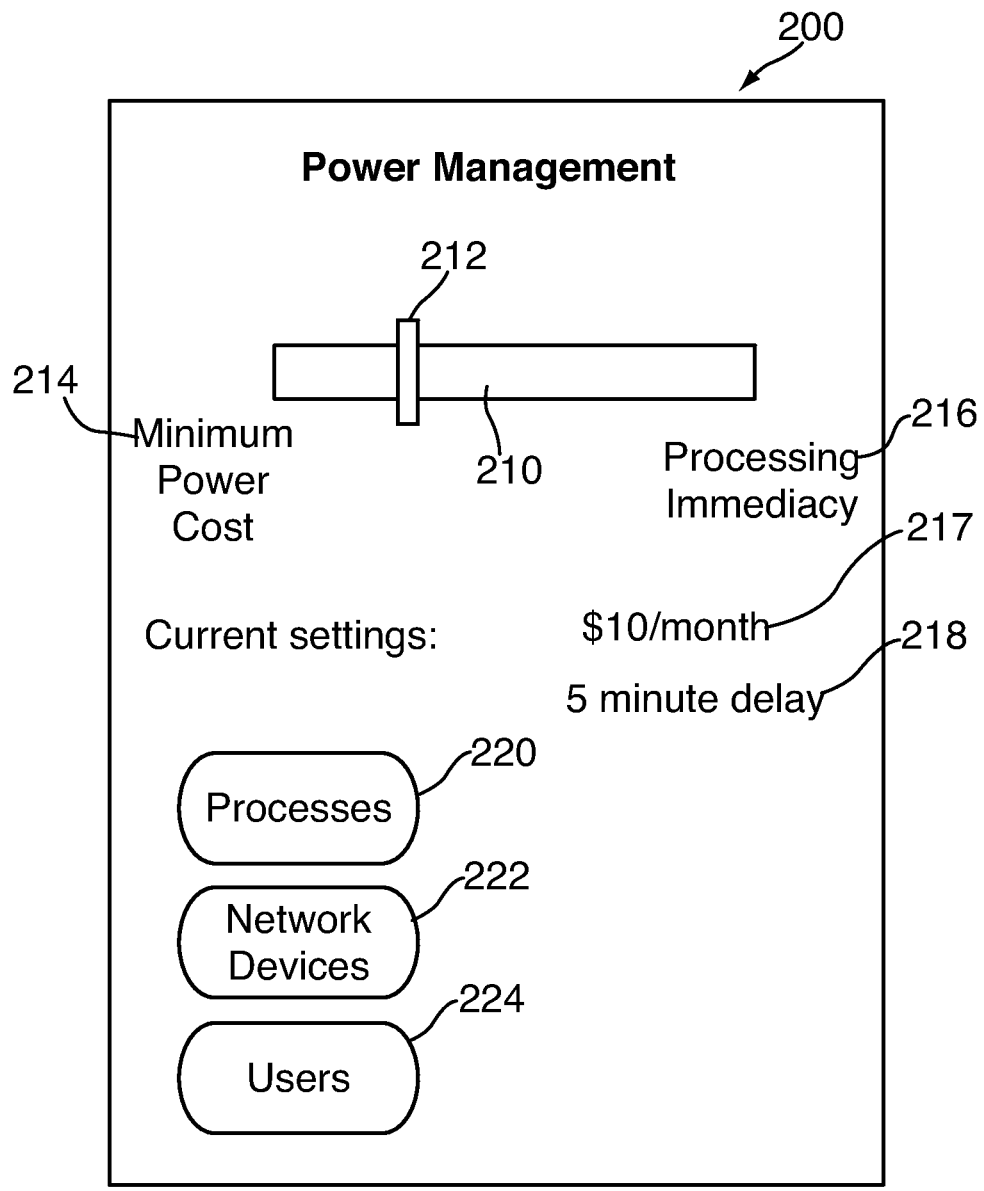
FIG. 2 is a schematic view of an illustrative display for managing power consumption in accordance with one embodiment of the invention.

In some embodiments, an electronic device can provide an interface for managing the power consumption of the associated electronic device. FIG. 2 is a schematic view of an illustrative display for managing power consumption in accordance with one embodiment of the invention. Display 200 can include bar 210 providing a graphical representation of the cost of power as the electronic device operates. Bar 210 can include movable slider 212 that can be placed between ends 214 and 216 of bar 210. Each of ends 214 and 216 can represent a limit of power consumption management for the associated electronic device. For example, end 214 can be associated with minimizing the power cost of operating the electronic device (e.g., by scheduling electronic device processes based on the cost of power), and end 216 can be associated with disregarding power cost considerations to ensure rapid or immediate execution of electronic device processes. The user can drag slider 212 to select a particular balance of processing efficiency and power cost of interest. Display 200 can include any other suitable information to assist a user in making such a determination, including for example cost indication 217 (e.g., providing an estimate of the power cost of each configuration of the electronic device) and processing delay indication 218 (e.g., providing an indication of the delay between providing an instruction to perform an operation and the actual execution of the operation). In some embodiments, the user can manage the power costs of electronic device operations using an interface other than bar 210 and slider 212, including for example by providing a power cost cap, processing immediacy maximum delay, percentage or value indicating the relative importance of power cost and processing immediacy, or any other suitable interface. The cost limit set by slider 212 or using another approach can be applied to any suitable duration, including for example a per day, week or month limit.

In some embodiments, the user can access advanced power management settings. For example, display 200 can include processes option 220 for controlling the particular power settings of each process executed by the electronic device. As another example, display 200 can include network devices option 222 for controlling the particular power settings associated with each electronic device connected to a particular electronic device or to a network of devices. As still another example, display 200 can include users option 224 for setting power cost settings associated with each user of the electronic device or of different networked electronic devices.

Figure 3:
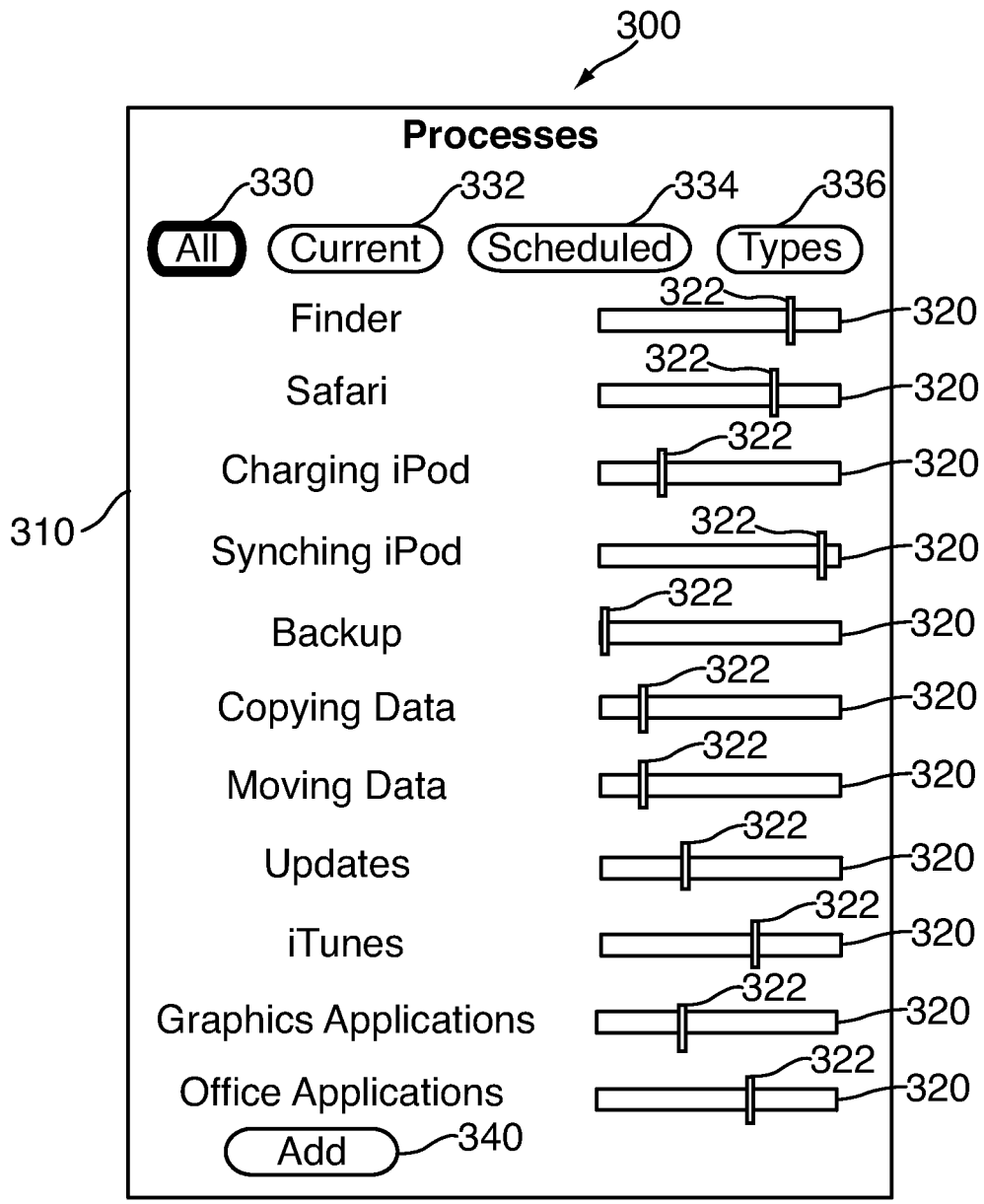
FIG. 3 is a schematic view of an illustrative display for managing the power consumption costs of individual processes in accordance with one embodiment of the invention.

FIG. 3 is a schematic view of an illustrative display for managing the power consumption costs of individual processes in accordance with one embodiment of the invention. A user can access display 300 using any suitable approach, including for example in response to selection processes option 220 (FIG. 2). Display 300 can include listing 310 of processes to be performed by the electronic device. In some embodiments, listing 310 can include specific processes scheduled to be performed, or being performed pursuant to a user instruction and categories, types or classes of processes. The user can limit the processes displayed in listing 310 using any suitable approach, including using displayed options related to the types of processes. For example, a user can select All option 330 to display all current, scheduled, and potential future processed that could be performed by the electronic device, Current option 332 for displaying the processes that are currently being executed by the electronic device, Scheduled option 334 for displaying the processes that a user has directed the electronic device to perform but that are not yet being performed (e.g., regular scheduled processes such as automatically checking for updates, or processes that were delayed due to power cost considerations), and Types option 336 for displaying categories or types of processes that the electronic device could perform (e.g., graphics applications, office applications, media operations, data transfer operations). In some embodiments, each listing in listing 310 can include an indication of the type of process to which it relates (e.g., use different colors, fonts, or icons for current, scheduled, and types of processes).

Each listing 310 can be associated with an individual bar 320 and slider 322, which the user can individually select and move to set the relative importance of power cost and processing immediacy for each process. In some embodiments, other interfaces can be used instead of or in addition to bars 320 and sliders 322, including for example providing power cost or processing delay caps, numerical indications of relative importance (e.g., a percentage of importance), or any other suitable interface. In some embodiments, display 300 can instead or in addition allow a user to set the relative importance of each listing in listings 310. For example, display 300 can allow a user to order processes by importance such that when power is limited, only the first processes in the ordering are executed. Display 300 can include any suitable interface for indicating the relative importance of processes, including for example assigning numerical values to each process, placing each process in an ordered list, or any other suitable display. In some embodiments, the user can direct display 300 to order listing 310 based on the user defined setting of sliders 322 to view an ordering of the relative importance of each process.

In some embodiments, the user can define the power consumption restrictions additional processes or types of processes. For example, the user can set the power consumption of one or more particular applications or types of applications (e.g., a preferred data transferring application) to ensure that the application operates as quickly as possible (e.g., with little regard to power costs). As another example, the user can set the power consumption of one or more particular applications or types of applications (e.g., media playback applications on an office computer) such that the applications only operate when the power costs are low. The user can add or define processes using any suitable approach, including for example by selecting Add option 340. Although it is not shown, a user can set power cost criteria for different users of one or more electronic device using a display having options similar to those of display 300 (e.g., a display with a listing of users and associated bars and sliders for defining the power cost criteria of each user).

Figure 4:
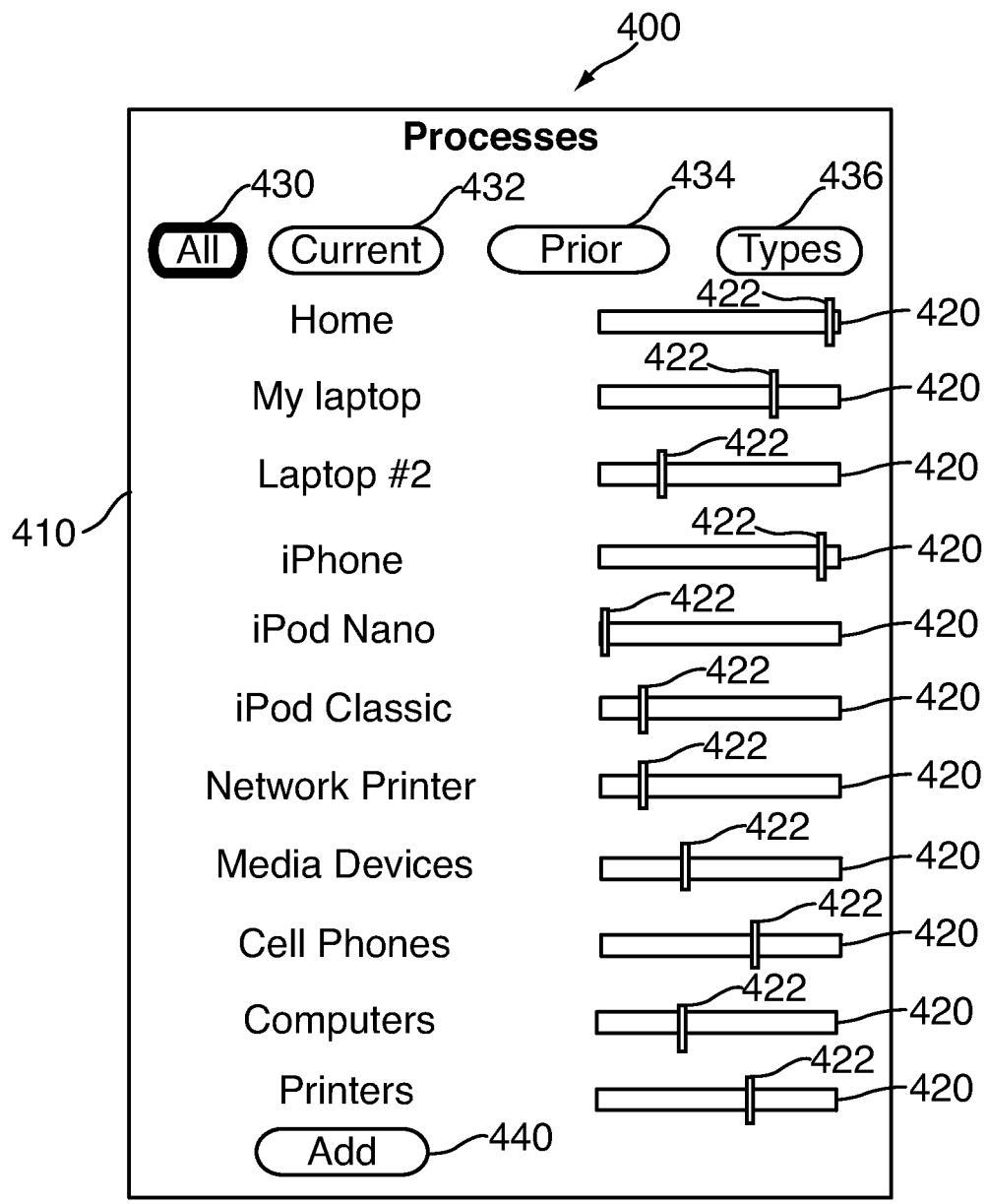
FIG. 4 is a schematic view of an illustrative display for managing the power consumption costs of individual electronic devices in a network in accordance with one embodiment of the invention.

FIG. 4 is a schematic view of an illustrative display for managing the power consumption costs of individual electronic devices in a network in accordance with one embodiment of the invention. A user can access display 300 using any suitable approach, including for example in response to selection Network Devices option 222 (FIG. 2). Display 400 can include listing 410 of devices coupled to a network for which power consumption costs can be controlled. In some embodiments, listing 310 can include specific devices connected to the network, devices previously connected to the network, and categories, types or classes of devices (e.g., printers, computers, mobile devices). The user can limit the devices displayed in listing 410 using any suitable approach, including using displayed options related to the types of devices. For example, a user can select All option 430 to display all current, past and types of devices that are, have been or can be coupled to the network, Current option 432 for displaying the devices that are currently connected to the network, Prior option 434 for displaying the processes that in the past have been coupled to the network but are not currently coupled to the network, and Types option 436 for displaying categories or types of electronic devices that could be coupled to the network (e.g., computers, printers, portable devices, devices requiring only power, or devices providing data transfers to host devices). In some embodiments, each listing in listing 310 can include an indication of the type of process to which it relates (e.g., use different colors, fonts, or icons for current, scheduled, and types of processes).

Each listing 410 can be associated with an individual bar 420 and slider 422, which the user can individually select and move to set the relative importance of power cost and processing immediacy for each device. In some embodiments, other interfaces can be used instead of or in addition to bars 420 and sliders 422, including for example providing power cost or processing delay caps, numerical indications of relative importance (e.g., a percentage of importance), or any other suitable interface. In some embodiments, display 400 can instead or in addition allow a user to set the relative importance of each listing in listings 410. For example, display 400 can allow a user to sort devices by importance such that when power is limited, only the first devices in the ordering receive power. Display 300 can include any suitable interface for indicating the relative importance of devices, including for example assigning numerical values to each device, placing each device in an ordered list, or any other suitable display. In some embodiments, the user can direct display 400 to order listing 410 based on the user defined setting of sliders 422 to view an ordering of the relative importance of each device. In some embodiments, the user can define a varying limit for the power cost of a particular device. For example, the electronic device can define a condition that substantially ignores power costs when a mobile device is charged from a discharged state, and progressively increase the importance of power costs as the device charge rises (e.g., and exceeds a particular cap, such as 60% charge).

In some embodiments, the user can define the power consumption restrictions additional devices or types of devices not initially listed in listing 410. For example, the user can set the power consumption of one or more particular devices or types of devices (e.g., a specific model of portable media devices, such as an ipod Touch available from Apple Inc.) to ensure that the device receives power as quickly as possible for charging or data transfers. As another example, the user can set the power consumption of one or more particular devices or types of devices (e.g., a networked printer) such that the device operations (e.g., prints documents) only when the power costs are low. The user can add or define processes using any suitable approach, including for example by selecting Add option 440.

Any suitable user of an electronic device in the network can define the power consumption of processes or devices. In some embodiments, administrative rights, for example determined from a proper username/password combination, can be required to set or define power consumption characteristics. The electronic device can prompt the user to provide administrative credentials at any suitable time, including for example prior to accessing display 200 (FIG. 2) or in response to selecting an option of display 200 or a subsequent display (e.g., displays 300 and 400, FIGS. 3 and 4, respectively). If several electronic devices are interconnected, for example in a network, a user can control the power consumption of different devices on the network based on one or more of which devices are directly connected to the device used by the user (e.g., without the intermediary of another electronic device), the user's rights on each of the network devices, the types of devices, the relative rights or importance of each device on the network, the capabilities of each device, or any other suitable criteria. For example, a user may be required to first provide an administrative password associated with a second computer to set the power consumption limits of the second computer, peripheral devices of the second computer (e.g., one or more printers and portable electronic devices coupled to the second computer), processes of the second computer, and processes of the peripheral devices of the second computer. In some embodiments, an electronic device (e.g., a more important electronic device) can require a user to set power consumption settings directly from the device (e.g., and not from a less important device of the network).

Figure 5:
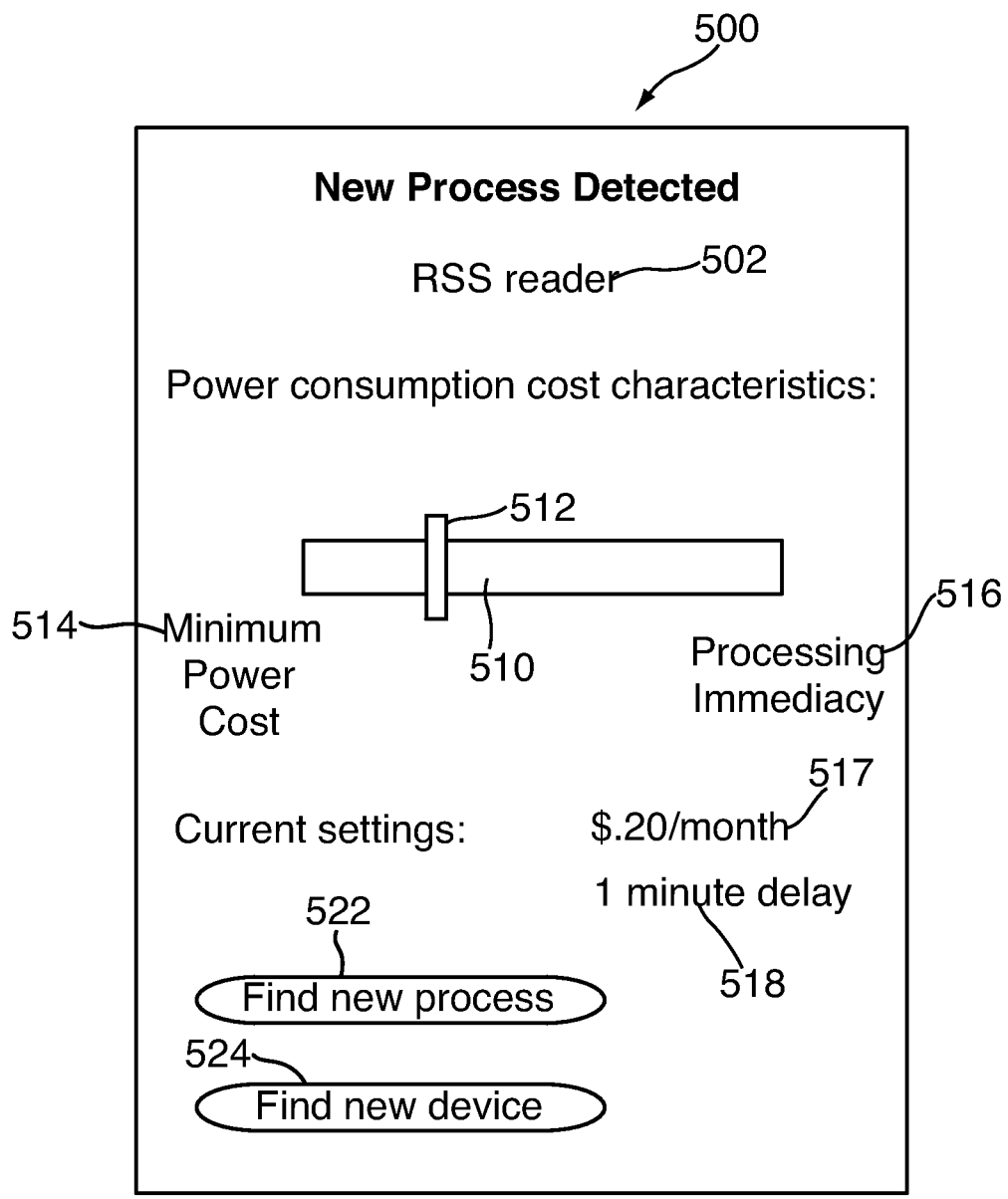
FIG. 5 is a schematic view of an illustrative display screen for defining the power consumption characteristics of a new process in accordance with one embodiment of the invention

When a user starts a new operation or process, or connects an additional device to the network, the electronic device can prompt the user to set the power consumption characteristics for the new process or device. FIG. 5 is a schematic view of an illustrative display screen for defining the power consumption characteristics of a new process in accordance with one embodiment of the invention. Although display 500 illustrates defining power consumption cost characteristics for a new process, it will be understood that a substantially similar display, or a display providing substantially similar options can be provided for setting the power consumption characteristics of a new device. Display 500 can include listing 502 identifying a new process detected by the electronic device. Display 500 can be displayed at any suitable time, including for example automatically in response to detecting a new process, when an application is run for the first time, each time an application is run (e.g., creating a process for the control circuitry or processor), in response to a user selecting an option within an application, or at any other suitable time. If several new processes are displayed, several listings 502 can be provided on the same display, or several displays 500 with different listings 502 can be provided.

Display 500 can include bar 510 providing a graphical representation of the cost of power for the process of listing 502 as the electronic device operates. Bar 510 can include movable slider 512 that can be displaced between ends 514 and 516 of bar 510. Each of ends 514 and 516 can represent a limit of power consumption management for the associated electronic device. For example, end 514 can be associated with minimizing the power cost of the process (e.g., by scheduling the process based on the cost of power), and end 516 can be associated with disregarding power cost considerations to ensure rapid or immediate execution of the process. The user can drag slider 512 to select a particular balance of processing efficiency and power cost of interest. Display 500 can include any other suitable information to assist a user in making such a determination, including for example cost indication 517 (e.g., providing an estimate of the power cost for the current power setting for the process of listing 502) and processing delay indication 518 (e.g., providing an indication of the delay between providing an instruction to perform the process and actually performing the process). In some embodiments, the user can manage the power costs of the process using an interface other than bar 510 and slider 512, including for example by providing a power cost cap, processing immediacy maximum delay, percentage or value indicating the relative importance of power cost and processing immediacy, or any other suitable interface.

The user can search for other devices or processes for which to set power consumption characteristics using any suitable approach. For example, the user can select Find new process option 522 or Find new devices option 524 to search for new processes or options, respectively, for which specific power consumption characteristics have not been defined. In response to receiving a user selection of one of options 522 or 524, the electronic device can display a listing of processes or devices for which no power consumption characteristic is set (e.g., for which a default characteristic used) or for which only a generic type characteristic is used (e.g., processes or devices for which specific characteristics overruling a type characteristic are not yet defined). The user can select any of the displayed listings to access a display similar to display 500 for the selected process or device.

Figure 6:
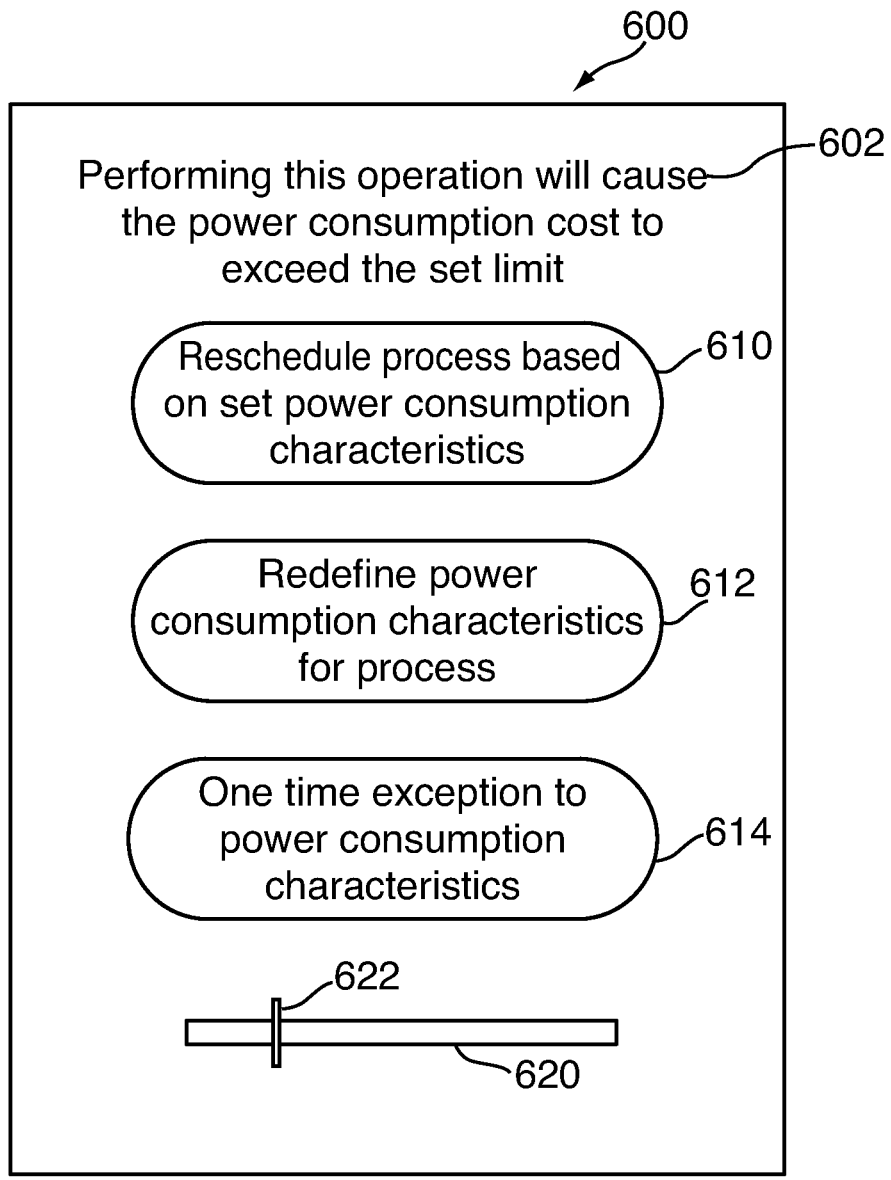
FIG. 6 is a schematic view of an illustrative display provided prior to exceeding set power consumption characteristics in accordance with one embodiment of the invention

As the user operates the electronic device, the user may instruct the device to perform an operation that would cause the device to exceed the power consumption cost set for the particular device or for a particular process. FIG. 6 is a schematic view of an illustrative display provided prior to exceeding set power consumption characteristics in accordance with one embodiment of the invention. Display 600 can include message 602 indicating to the user that executing a particular operation will cause the power consumption cost of the operation (e.g., the process or device operation) to exceed a set limit. Display 600 can be provided to the user at any suitable time, including for example in response to receiving a user request to perform a particular operation (e.g., a user opening an application, or directing an application to perform a task, or connecting a peripheral device to a host device for power or data transfers). Display 600 can be provided using any suitable approach, including for example as a pop-up window, new display, or any other suitable approach. Display 600 can provide the user with options for several actions in response to determining that the power consumption cost will exceed a limit. For example, display 600 can include Reschedule option 610 for directing the electronic device to reschedule the process to a later time when performing the process will not cause the power consumption cost to exceed the limit. The electronic device can distribute the process over time to reduce the power cost, or reschedule the process for a subsequent billing or accounting period (e.g., the process type has used its quota of power cost for the day or week, and the process must wait for the following day or week).

In some embodiments, display 600 can also or in addition include Redefine option 612 and One-time exception option 614. In response to receiving a user selection of Redefine option 612, the electronic device can prompt the user to redefine the power consumption cost characteristics associated with the process or device at issue. For example, the electronic device can provide a display similar to display 200 (FIG. 2) for the process or device. As another example, the electronic device can selective integrate an interface for changing the power consumption cost characteristics in display 600. In response to a user selection of One-time exception option 614, the electronic device can prompt the user to define a one-time exception to the power consumption cost settings for the process. In response to receiving a user selection of one of options 612 or 614, the electronic device can provide bar 620 depicting the range of power consumption cost settings for each process, and slider 622 for selecting a particular setting. To prevent unauthorized users from modifying the power consumption settings, display 600 can prompt a user for authentication information (e.g., an administrative password) prior to displaying bar 620 and slider 622, or any other interface for defining the power consumption cost settings. In some embodiments, the electronic device can automatically adjust the power cost limits of other processes or devices in response to receiving the user selection of a redefine or one-time exception option to ensure that the overall power cost of the device remains constant (e.g., lower the power cost allocations associated with other processes to account for the increase requested by the user for the current process).

Figure 7:
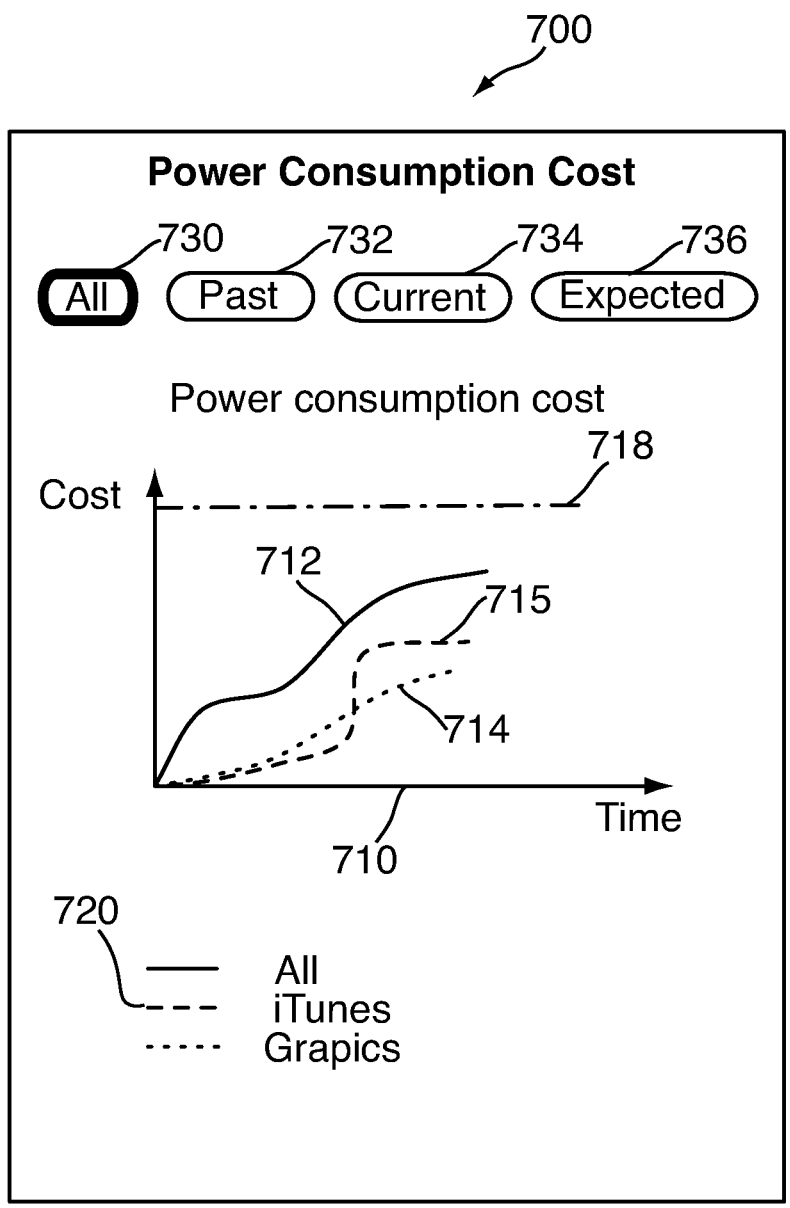
FIG. 7 is a schematic view of an illustrative display for providing a representation of power costs in accordance with one embodiment of the invention

The user can monitor past and current power consumption costs using any suitable approach. In some embodiments, the electronic device can provide a display indicating past, current and expected future power consumption costs. FIG. 7 is a schematic view of an illustrative display for providing a representation of power costs in accordance with one embodiment of the invention. Display 700 can include graph 710 providing a visual depiction of the evolution of power consumption cost over time. Graph 710 can include time and cost axes, over which cost curve 712 can be plotted to represent the power cost of operating the electronic device over time. In some embodiments, the user can view the power cost of particular processes over time, indicated for example by curves 714 and 715. Display 700 can include legend 720 indicating the meaning of each of curves 712, 714 and 715, which can be differentiated using any suitable approach (e.g., different colors, line thickness, or line type). Graph 710 can include limit 718 indicating a graphical limit to the power consumption cost allocated to the device. In the example of FIG. 7, line 718 reflects a constant limit, though it will be understood that any other suitable type of limit can be used.

The user can direct graph 710 to display different curves using any suitable approach, including for example by selecting one or more of All option 730, Past option 732, Current option 734 and Future option 736 (e.g., to display representations for the power cost of all, past, current and future processes or devices connected to the network). In some embodiments, display 700 can include one or more options for directing graph 710 to display curves for particular processes or devices. For example, display 700 can include a processes option (not shown) for viewing a listing of known processes.

Figure 8:
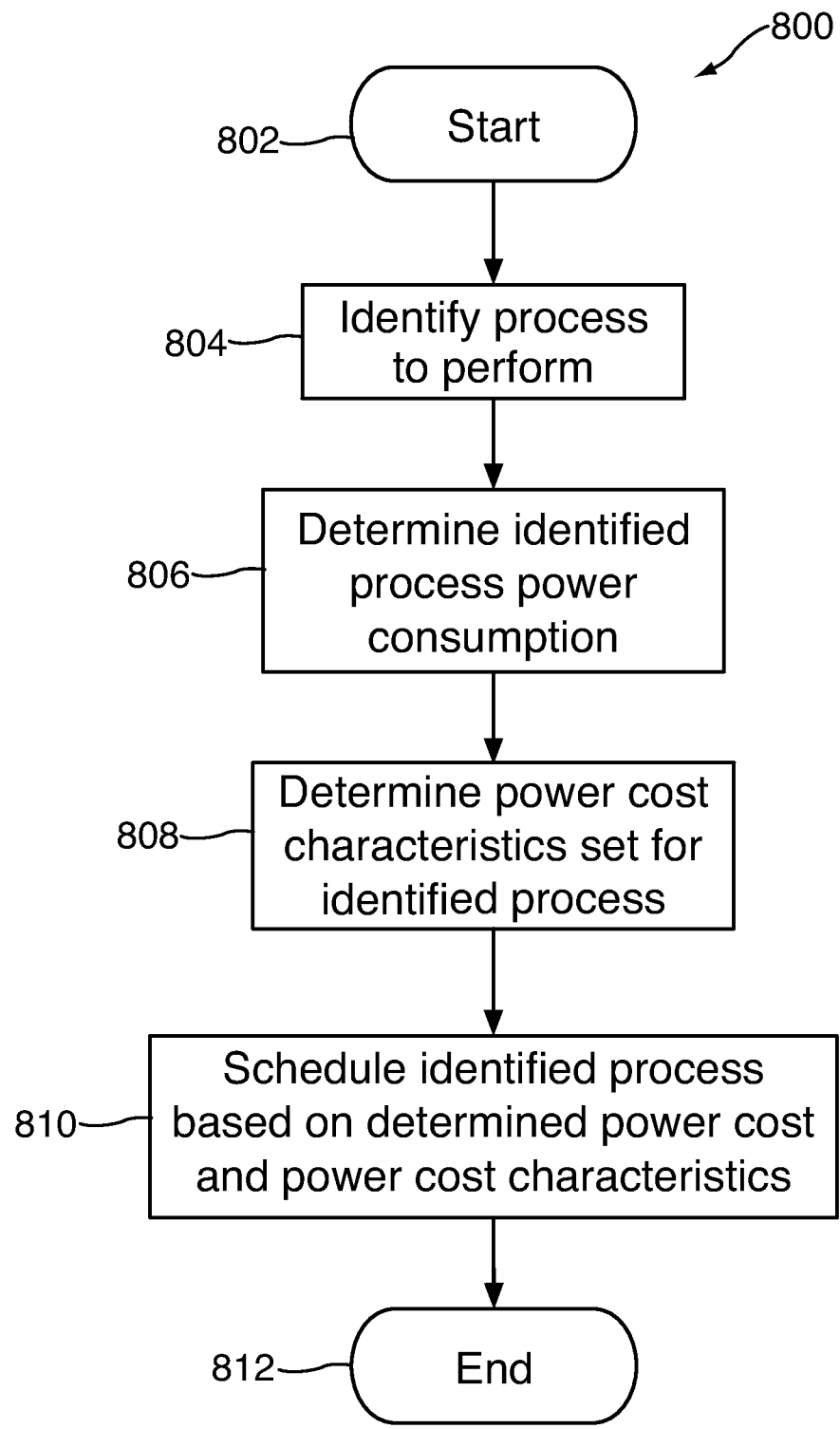
FIG. 8 is a flow chart of an illustrative process for performing an electronic device process based on allocated power consumption costs in accordance with one embodiment of the invention

The following flow charts describe illustrative processes for managing the power cost of electronic devices and electronic device processes and operations. FIG. 8 is a flow chart of an illustrative process for determining whether to perform an electronic device process based on allocated power consumption costs in accordance with one embodiment of the invention. Process 800 can begin at step 802 and at step 804, the electronic device can identify an illustrative process to perform. For example, the electronic device can receive an instruction from a user to perform a process associated with an application. As another example, the electronic device can identify a process to be performed by an operating system. At step 806, the electronic device can determine the expected power consumption for the identified process. For example, the electronic device can determine the components required to perform the process, and the duration of the activity for each component. As another example, the electronic device can determine the number of computations required by the electronic device to perform the identified process. As still another example, the electronic device can determine, from a reference of power requirements or based on previous requirements for the same or similar processes, the power consumption of the identified process.

At step 808, the electronic device can determine the power cost characteristics set for the identified process. For example, the electronic device can determine the relative importance of power cost and processing immediacy for the identified process (e.g., from a slider setting for the identified process). As another example, the electronic device can determine a maximum power cost value for the category of processes of the identified process. At step 810, the electronic device can schedule the identified process based on the determined power cost and power cost characteristics set for the identified process. For example, the electronic device can determine the power cost of the process at different times (e.g., determined at peak and off-peak power times) and schedule the process for the earliest time when the power cost satisfies the power cost characteristics set by the user. In particular, if the power cost characteristic includes a maximum cost, the electronic device can schedule the identified process for execution at the earliest time that allows the power cost to be less than the maximum cost. In some embodiments, the identified process can be schedule for a time and duration that are associated with different power costs (e.g., start in peak time and finish in off-peak time). Process 800 can then end at step 812.

Figure 9:
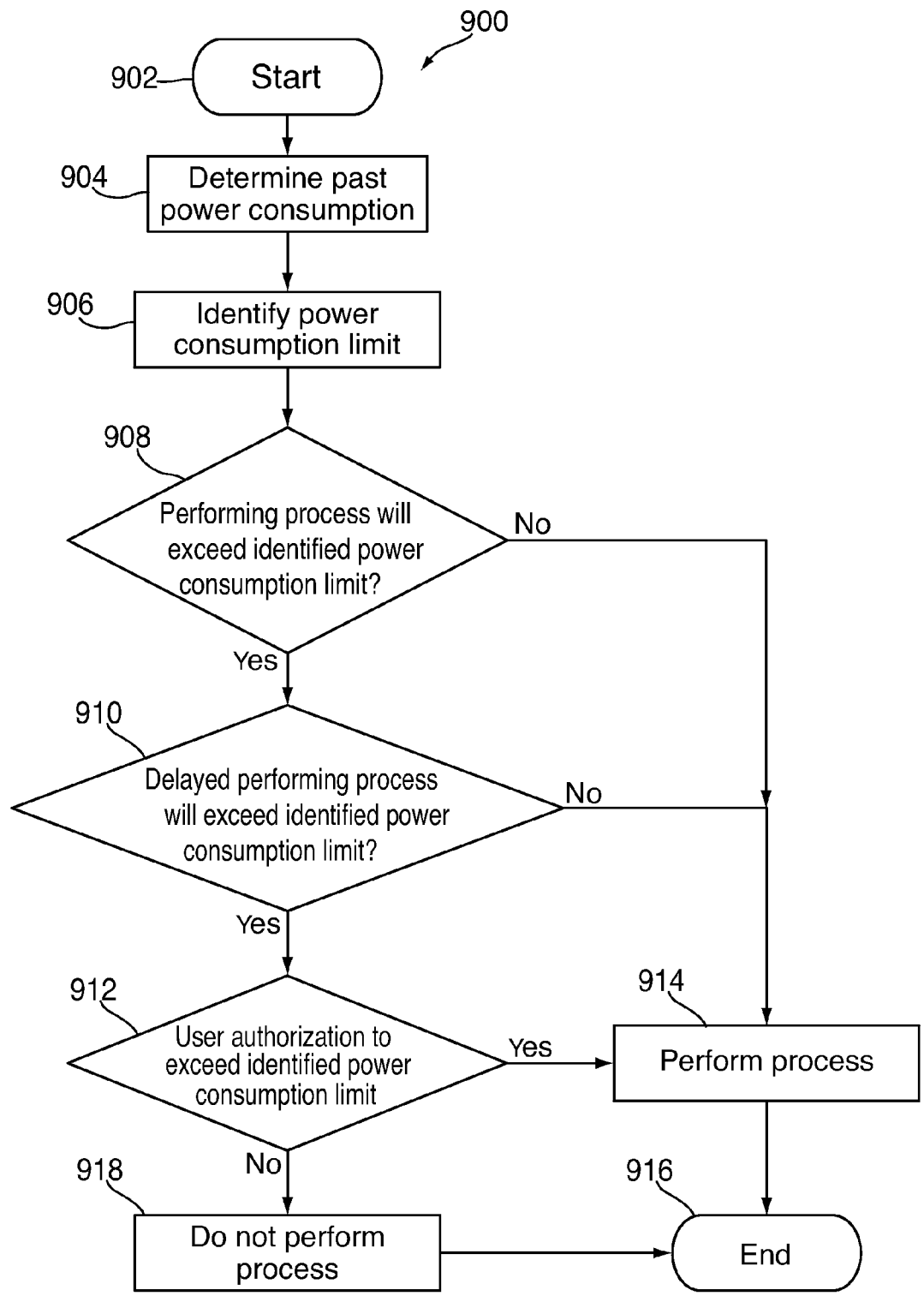
FIG. 9 is a flowchart of an illustrative process for determining when to perform a process in accordance with one embodiment of the invention.

FIG. 9 is a flowchart of an illustrative process for determining when to perform a process in accordance with one embodiment of the invention. Process 900 can begin at step 902. At step 904, the electronic device can determine past power consumption. For example, the electronic device can determine the cost of previous power consumption within a given duration (e.g., in the past day, week or month) for which a power consumption limit applies. In some embodiments, the electronic device can determine power consumption for particular processes (e.g., the current process), types of processes, or devices in a network. At step 906, the electronic device can identify the applicable power consumption limit. For example, the electronic device can determine the maximum cost per given duration associated with the process, process type, or device of the process. At step 908, the electronic device can determine whether performing the particular process will exceed the identified power consumption limit associated with the process. For example, the electronic device can determine the power cost of executing the process at the current time and compare the sum of past power consumption costs with the expected cost of the current process with the identified power consumption limit. To determine the expected cost, the electronic device can determine the amount of power to be consumed by various electronic device components to perform the process and the duration of the process, and the cost of the determined amount of power during the determined duration (e.g., from information provided by a power provider).

If the electronic device determines that performing the process will exceed the identified power consumption limit, process 900 can move to step 910. At step 910, the electronic device can determine whether delaying the performance of the process will exceed the identified power consumption limit associated with the process. For example, the electronic device can determine the power cost of the process when power provided by the power source is less than the current cost of power. If the power source provides power at several lesser prices at different times, the electronic device can identify the earliest of the different times, if any, for which the power cost of performing the process will not exceed the identified power consumption limit. In some embodiments, the electronic device can prompt the user to accept or not to delay the process. If the electronic device determines that delaying the performance of the process will still exceed the identified power consumption limit, process 900 can move to step 912.

At step 912, the electronic device can determine whether a user authorized exceeding the identified power consumption limit. For example, the electronic device can determine whether a user instruction to overrule the identified power consumption limit was provided. In particular, the electronic device can determine whether administrative credentials have been provided. If the electronic device determines that user authorization has been provided, process 900 can move to step 914. In addition, if at step 910 the electronic device instead determines that delaying the performance of the process will not exceed the identified power consumption limit, process 900 can move to step 914. Also, if at step 908 the electronic device instead determines that performing the process will not exceed the identified power consumption limit, process 900 can move to step 914. At step 914, the electronic device can perform the process. For example, the electronic device can execute an application operation requested by the user, an operating system process or any other process to perform by the device. Process 900 can then end at step 916.

If, at step 912, the electronic device instead or in addition determines that no user authorization was provided, process 900 can move to step 918. At step 918, the electronic device can not perform the process. For example, the electronic device can remove the process from a process queue. Process 900 can then end at step 916.

Thus it is seen that computers and other network devices capable of monitoring electricity consumption, and methods and apparatus for scheduling computer activities to consume electricity during periods of lower electricity rates, have been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A computing device, comprising:
    a display device;
    a network interface;
    a processor; and
    a memory configured to store instructions that when executed by the processor cause the computing device to perform steps that include:
        determining a set of processing efficiency and power cost variables for an operation of an electronic device communicatively coupled to the computing device via the network interface;
        receiving, at the computing device, a user selection of a processing efficiency and a power cost;
        determining an estimate of power cost for a period of time based on the selected processing efficiency and the selected power cost;
        causing a cost indication to be displayed at the display device to provide the estimate of power cost;
        determining an estimate of an expected delay time between a request of an operation and an initiation of the operation, wherein, the expected delay time is based on the selected processing efficiency and power cost;
        causing a processing delay indication to be displayed at the display device, the processing delay indication configured to provide the estimate of the expected delay time; and
        controlling the initiation of the operation of the electronic device based on the selected processing efficiency and the selected power cost.

2. The computing device as recited in claim 1, wherein the steps further include:
    determining a past power consumption for the operation of the electronic device.

3. The computing device as recited in claim 1, wherein the steps further include:
    causing the display device to display a primary power usage control that allows selection of a plurality of values for balancing processing efficiency against power cost.

4. The computing device as recited in claim 2, wherein the estimate of power cost is further based on the past power consumption for the operation of the electronic device.

5. The computing device as recited in claim 4, wherein the steps further include:
    causing the display device to display a filtering control configured to limit a number of displayed power usage controls to those associated with processes that are currently in use.

6. The computing device as recited in claim 3, wherein the steps further include:
    causing the display device to display a secondary power usage control associated with a user of the electronic device, thereby allowing receipt of a user defined relative importance for the user.

7. The computing device as recited in claim 6, wherein the steps further include:
    determining a power consumption limit for the operation based upon the selected processing efficiency and the selected power cost.

8. The computing device as recited in claim 3, wherein the steps further include:
    before controlling the initiation of the operation, determining that the expected delay time does not cause power consumption of the operation to exceed the power consumption limit.

9. A machine-readable non-transitory storage medium storing instructions that, when executed by a processor included in a computing device, cause the computing device to carry out steps that include:
- establishing a network connection with a network device;
- receiving, at the computing device, a selection of a process to perform at the network device;
- determining power consumption for the process;
- determining a power cost characteristic set for the process, wherein the power cost characteristic is based on a power usage control configured to allow a user to select a processing efficiency and a power cost for the process;
- generating an estimate of power cost for the selected processing efficiency and power cost over a period of time;
- determining an expected delay time between a request that the process be executed and an initiation of the process, the expected delay time at least partially based on the selected processing efficiency and power cost;
- generating an indication of the expected delay time; and
- controlling the initiation of the process based on the power cost characteristic and the power cost.

10. The machine-readable non-transitory storage medium as recited in claim 9, wherein the steps further include:
- retrieving electricity rate information including time-of-day pricing information;

and determining power cost based on power consumption of the process and the time-of-day pricing information.

11. The machine-readable non-transitory storage medium as recited in claim 10, wherein the steps further include:
- requesting the user to override the process when execution of the process is projected to exceed the power cost established for the process.

12. The machine-readable non-transitory storage medium as recited in claim 11, wherein scheduling the process comprises delaying performance of a task until a time of lower power cost.

13. The machine-readable non-transitory storage medium as recited in claim 12, wherein the network device is in wireless communication with the computing device.

14. The machine-readable non-transitory storage medium as recited in claim 9, wherein the steps further include:
- causing a display device of the computing device to display a plurality of power usage controls, each power usage control representing one or more network devices managed by the computing device, wherein the plurality of power usage controls allow the user to assign relative importance to different electronic devices.

15. The computing device of claim 1, wherein determining an estimate of power cost comprises:
- determining estimated power requirements of the operation; and
- determining a power cost during the period of time for the estimated power requirements.

16. The computing device of claim 15, wherein determining a power cost during the period of time comprises:
- accessing published cost-of-power information from a power supplier; and
- determining a power cost for the period of time.

17. The computing device of claim 15, wherein determining estimated power requirements of the operation comprises:
- determining which components of the computing device will be used to perform the operation; and
- determining for how long each of the components will be utilized to perform the operation.

18. The computing device of claim 1, wherein controlling the initiation of the operation of the electronic device comprises:
- distributing performance of one or more processes throughout the period of time to minimize the total power cost during the period of time.

* * * * *